United States Patent
Ouyang et al.

(10) Patent No.: US 9,344,534 B2
(45) Date of Patent: May 17, 2016

(54) METHOD AND APPARATUS FOR PERFORMING DATA PROCESSING AND DATA TRANSMISSION BY 3G AE AND 3G RE

(71) Applicant: TENCENT TECHNOLOGY (SHENZHEN) COMPANY LIMITED, Shenzhen, Guangdong (CN)

(72) Inventors: Kai Ouyang, Guangdong (CN); Wei Wang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 199 days.

(21) Appl. No.: 14/187,116

(22) Filed: Feb. 21, 2014

(65) Prior Publication Data

US 2014/0169308 A1    Jun. 19, 2014

Related U.S. Application Data

(63) Continuation of application No. PCT/CN2012/078170, filed on Jul. 4, 2012.

(30) Foreign Application Priority Data

Aug. 23, 2011 (CN) .......................... 2011 1 0242793

(51) Int. Cl.
H04L 29/06 (2006.01)
H04W 92/04 (2009.01)
H04W 72/04 (2009.01)
H04W 84/04 (2009.01)

(52) U.S. Cl.
CPC .............. *H04L 69/168* (2013.01); *H04L 69/14* (2013.01); *H04W 72/0453* (2013.01); *H04W 92/045* (2013.01); *H04W 84/047* (2013.01)

(58) Field of Classification Search
None
See application file for complete search history.

(56) References Cited

U.S. PATENT DOCUMENTS

| 2006/0133338 | A1* | 6/2006 | Reznik | H04L 27/3477 370/338 |
| 2008/0062909 | A1* | 3/2008 | Shin | H04B 7/022 370/315 |
| 2009/0092153 | A1* | 4/2009 | Howard | H04L 49/3072 370/474 |

FOREIGN PATENT DOCUMENTS

| CN | 101384011 A | 3/2009 |
| CN | 101483931 A | 7/2009 |
| CN | 101951370 A | 1/2011 |
| WO | 2005/046142 A1 | 5/2005 |

* cited by examiner

*Primary Examiner* — Khoa Huynh
(74) *Attorney, Agent, or Firm* — Knobbe Martens Olson & Bear LLP

(57) ABSTRACT

A data transmission method and apparatus are disclosed. A 3G AE and a 3G RE are deployed between a sender device and a receiver device, M channels are established between the 3G AE and the 3G RE, and M is larger than or equal to 2. The method includes that, the 3G AE encapsulates data sent by the sender device into N PDUs, and transmits the N PDUs to the 3G RE through the M channels between the 3G AE and the 3G RE; and the 3G RE restores the received PDUs to the data sent by the sender device, and sends the data to the receiver device; where N is larger than or equal to 2, and equal to or different from M.

5 Claims, 3 Drawing Sheets

METHOD AND APPARATUS FOR PERFORMING DATA PROCESSING AND DATA TRANSMISSION BY 3G AE AND 3G RE

This application is a continuation of International Application No. PCT/CN2012/078170, filed on Jul. 4, 2012. This application claims the benefit and priority of Chinese Patent Application No. 201110242793.4, filed Aug. 23, 2011. The entire disclosures of each of the above applications are incorporated herein by reference.

FIELD OF THE INVENTION

The present application relates to mobile communication technologies, and more particularly to a data transmission method and apparatus.

BACKGROUND OF THE INVENTION

3rd-Generation (3G) mobile communication technologies improve the coverage of Internet, so that a user in a region having no fundamental network construction can access Internet via a 3G base station. The bandwidth of stable 3G network is usually 1-2 Mb/s, which is much smaller than the bandwidth of cable network and the bandwidth of WIFI network. The cable network usually has an Ethernet interface and a fiber interface, and the bandwidth of cable network is about 1 Gb/s. The bandwidth of WIFI network is about 54 Mb/s.

At present, network communication software is usually constructed on Transmission Control Protocol (TCP) and User Datagram Protocol (UDP), and thus cannot be adjusted and optimized dynamically according to a fundamental network environment. Accordingly, much communication software can provide a good service quality in the cable network and the WIFI network, but cannot meet service requirements in the 3G network. The reason is that signals in the 3G network are unstable and the bandwidth of 3G network is much smaller than that of the cable network and the WIFI network. Typically, if there is no WIFI access point or access device of cable network, audio-visual data can only be transmitted in real time through the 3G network having narrow bandwidth and unstable signals, which results in the delay of the transmitted audio-visual data, packet loss and discontinuous image.

SUMMARY OF THE INVENTION

Examples of the present application provide a data transmission method and apparatus, thereby improving the quality of data transmission in a 3G network.

The solution of the present application is implemented as follows.

A data transmission method,

A data transmission apparatus includes

As can be seen from the above solution, through introducing the 3G AE and the 3G RE, the data sent by the sender device and the data received by the receiver device are not changed, but are processed during the transmission procedure. Detailedly, the 3G AE encapsulates the data sent by the sender device into N PDUs, and transmits the N PDUs to the 3G RE through M channels between the 3G AE and the 3G RE; and the 3G RE restores the received PDUs to the data sent by the sender device, and sends the data to the receiver device. The method of transmitting the PDUs in parallel through multiple channels between the 3G AE and the 3G RE can improve the quality of data transmission in the 3G network, increase bandwidth and stability compared with an original single channel, and decrease data delay and packet loss rate.

DETAILED DESCRIPTION OF THE INVENTION

In order to make the object, technical solution and merits of the present application clearer, the present application will be illustrated in detail hereinafter with reference to the accompanying drawings and specific examples.

Figure 1:
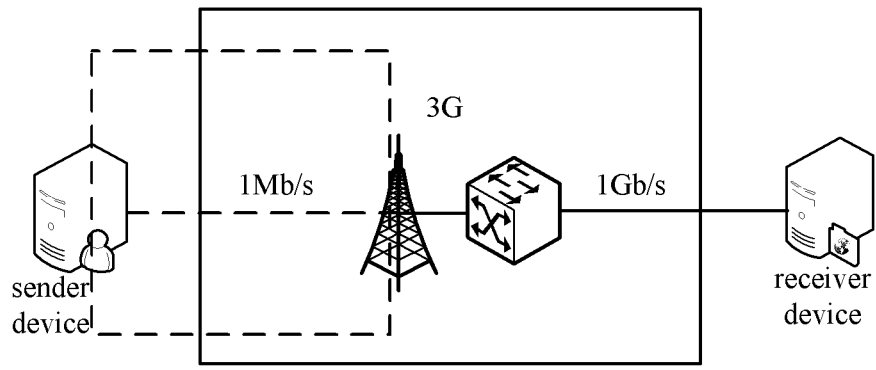
FIG. 1 is a schematic diagram illustrating 3G access of client terminal.

A 3G network communication model is extracted based on peer-to-peer technology. FIG. 1 is a schematic diagram illustrating 3G access of client terminal. As can be seen from FIG. 1, because the bandwidth of 3G network limits the service quality of 3G communication software, the problems described in the background are caused. Even if a 3G/4G network improves bandwidth in the future, the bandwidth of 3G/4G network is much smaller than the bandwidth of cable network or the bandwidth WIFI network according to Moore's Law.

In order to improve the quality of data transmission in the 3G network, multi-channel transmission is adopted in a method provided by an example of the present application. Through the multi-channel transmission and control, in a service logic layer, the bandwidth of 3G network is increased, the quality of data transmission is improved and transmission delay is decreased. The method provided by the example of the present application is illustrated with reference to FIG. 2.

In order to improve the quality of data transmission in the 3G network, in the method provided by the example of the present application, two transparent service devices including a 3G Access Endpoint (AE) and a 3G Relay Endpoint (RE) are deployed between a sender device and a receiver device. In an example, the 3G AE is deployed between the sender device and the 3G network, and is composed of a WIFI access point, and/or a cable interface such as a common twisted pair interface, and multiple 3G access interfaces. The 3G RE may be deployed in a provider backbone network connected to the receiver device.

M channels are established between the 3G AE and the 3G RE, where M is larger than or equal to 2. The M channels may be provided by one operator or multiple operators, through which the sender device accesses a public network via the 3G network and transmits data to the receiver device. Hereinafter, a process of transmitting the data through the M channels is illustrated with reference to FIG. 2.

Figure 2:
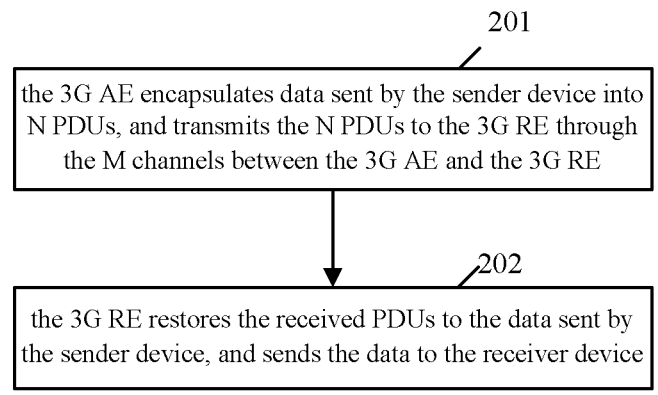
FIG. 2 is a schematic diagram illustrating a data transmission method according to an example of the present application.

FIG. 2 is a schematic diagram illustrating a data transmission method according to an example of the present application. As shown in FIG. 2, the method includes following blocks.

At block 201, the 3G AE encapsulates data sent by the sender device into N PDUs, and transmits the N PDUs to the 3G RE through the M channels between the 3G AE and the 3G RE.

N is larger than or equal to 2. N may be equal to or different from M, which is not limited in the present application.

The process of transmitting the N PDUs to the 3G RE through the M channels between the 3G AE and the 3G RE is illustrated hereinafter.

At block 202, the 3G RE restores the received PDUs to the data sent by the sender device, and sends the data to the receiver device.

As can be seen from the method provided by example of the present application, the data sent by the sender device and the data received by the receiver device are not changed, but are processed during the transmission procedure. It is not important for the data transmission how the data is processed, as long as the data can be received correctly by the receiver device. In this way, service transparency can be ensured, and black box processing for the multi-channel 3G access can be implemented, so that the conventional communication software can adapt to a new structure model without modification. Moreover, the PDUs are transmitted in parallel through multiple channels between the 3G AE and the 3G RE, thereby increasing bandwidth and stability of data transmission compared with an original single channel, and decreasing data delay and packet loss rate.

Figure 3:
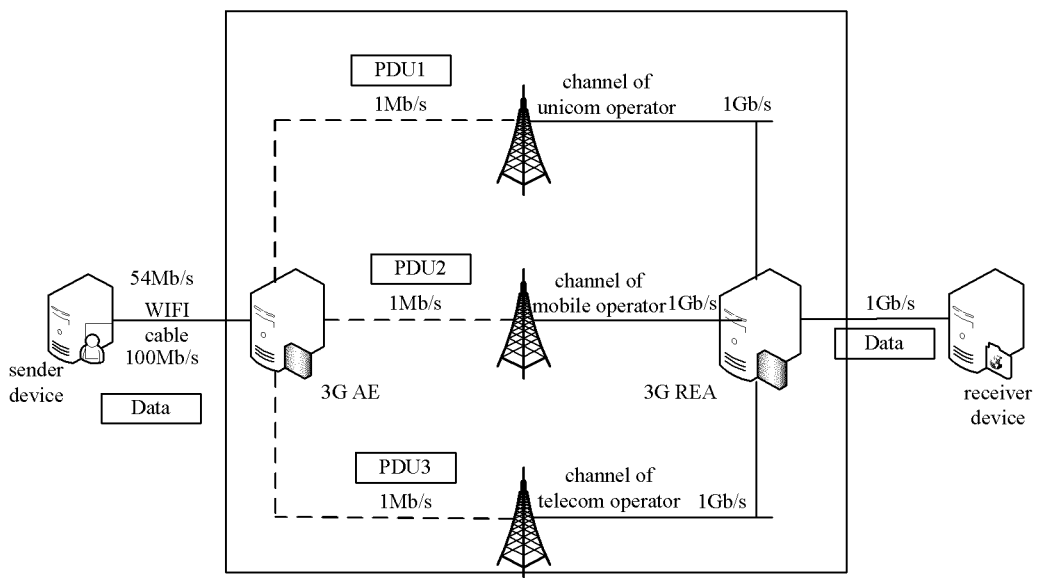
FIG. 3 is a schematic diagram illustrating a transmission model between a sender device and a receiver device according to an example of the present application.

And thus, the method shown in FIG. 2 ends. In an example, M is equal to 3, and the 3 channels are provided by a mobile operator, a unicom operator and a telecom operator respectively. Based on the method shown in FIG. 2, a transmission model between the sender device and the receiver device is shown in FIG. 3.

In order to make the method shown in FIG. 2 clearer, three examples are described hereinafter.

In a first example, the 3G AE encapsulates the data sent by the sender device into N PDUs via a fragment algorithm with high-concurrency and non-redundancy. Detailedly, the 3G AE divides the data sent by the sender device into N parts, encapsulates the N parts into N PDUs, and transmits the N PDUs to the 3G RE through the M channels between the 3G AE and the 3G RE.

In an example, the 3G AE divides the data sent by the sender device into N equal parts.

Figure 4:
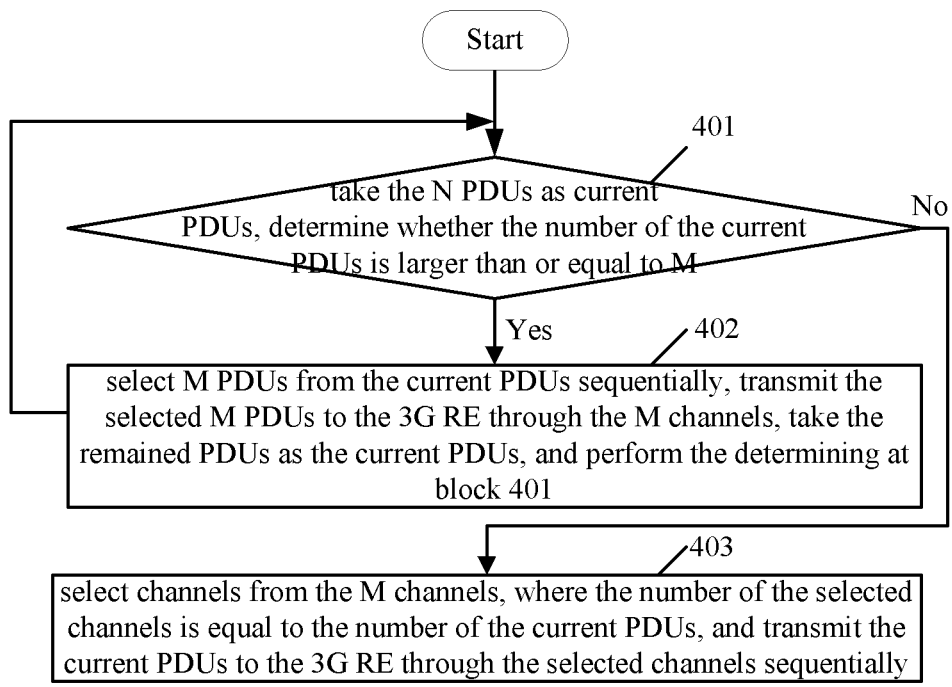
FIG. 4 is a schematic diagram illustrating a process of transmitting N PDUs to a 3G RE through M channels by a 3G AE according to an example of the present application.

In the first example, the process of transmitting, by the 3G AE, the N PDUs to the 3G RE through the M channels between the 3G AE and the 3G RE may refer to FIG. 4, and includes following blocks.

At block 401, the 3G AE takes the N PDUs as current PDUs, determines whether the number of the current PDUs is larger than or equal to M; if yes, block 402 is performed; otherwise, block 403 is performed.

At block 402, the 3G AE selects M PDUs from the current PDUs sequentially, transmits the selected M PDUs to the 3G RE through the M channels, takes the remained PDUs as the current PDUs, and performs the determining at block 401.

At block 403, the 3G AE selects channels from the M channels, where the number of the selected channels is equal to the number of the current PDUs, and transmits the current PDUs to the 3G RE through the selected channels sequentially.

Figure 5:
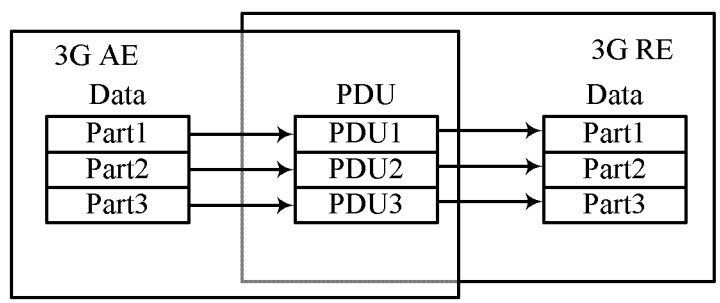
FIG. 5 is a schematic diagram illustrating a process of transmitting, by a 3G AE, data sent by a sender device to a 3G RE according to a first example of the present application.

In the first example, suppose N is equal to M, N and M are both equal to 3, and the 3 channels between the 3G AE and the 3G RE are provided by the mobile operator, the unicom operator and the telecom operator respectively. As shown in FIG. 5, the 3G AE divides the data sent by the sender device into 3 parts, recorded as part1, part2 and part3 respectively, and encapsulates the 3 parts into 3 PDUs, recorded as PDU1, PDU2 and PDU3 respectively. The 3G AE transmits the PDU1, PDU2 and PDU3 to the 3G RE through the 3 channels provided by the mobile operator, the unicom operator and the telecom operator respectively. Based on this, the process of restoring, by the 3G RE, the received PDUs to the data (recorded as original data) sent by the sender device includes that the 3G RE restores the received PDU1, PDU2 and PDU3 to the data sent by the sender device according to a reverse process of the dividing process. Afterwards, the 3G RE sends the data to the receiver device.

In the first example, maximum bandwidth utilization can be obtained. For example, if three channels are established between the 3G AE and the 3G RE, the obtained bandwidth is three times the original bandwidth. Moreover, when signals in the channels are stable, transmission throughout can be improved to a great extent.

In a second example, the 3G AE encapsulates the data sent by the sender device into N PDUs through a fragment algorithm with high-redundancy and non-concurrency. Detailedly, the 3G AE copies the data sent by the sender device into N copies, encapsulates the N copies into N PDUs, and transmits the N PDUs to the 3G RE through the M channels between the 3G AE and the 3G RE.

In the second example, the process of transmitting, by the 3G AE, the N PDUs to the 3G RE through the M channels between the 3G AE and the 3G RE may refer to FIG. 4, and may include that, because the N PDUs are the same, the 3G AE may select one or more PDUs at random and transmit the selected PDUs to the 3G RE, or may also select one or more PDUs according to practical requirements and transmit the selected PDUs to the 3G RE.

Figure 6:
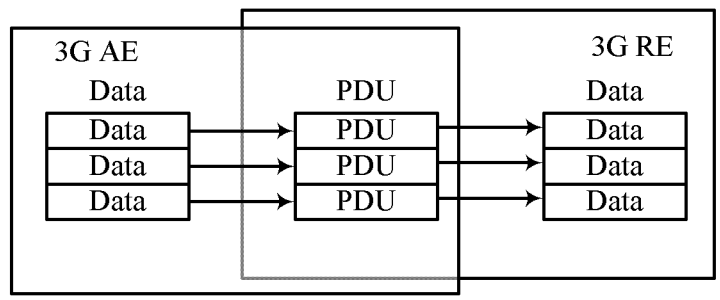
FIG. 6 is a schematic diagram illustrating a process of transmitting, by a 3G AE, data sent by a sender device to a 3G RE according to a second example of the present application.

In the second example, suppose N is equal to M, N and M are both equal to 3, and the 3 channels between the 3G AE and the 3G RE are provided by the mobile operator, the unicom operator and the telecom operator respectively. As shown in FIG. 6, the 3G AE copies the data sent by the sender device into 3 copies, encapsulates the 3 copies into 3 PDUs, and transmits the 3 PDUs to the 3G RE through the 3 channels provided by the mobile operator, the unicom operator and the telecom operator respectively.

In the second example, the process of restoring, by the 3G RE, the received PDUs to the data sent by the sender device includes that, the 3G RE restores a firstly received PDU to the data sent by the sender device, and discards subsequently received PDUs. For example, as shown in FIG. 6, if signals in a channel provided by the mobile operator are stable, the PDU transmitted through the channel provided by the mobile operator firstly reaches the 3G RE. The 3G RE only restores the PDU transmitted through the channel provided by the mobile operator to the original data, and discards other PDUs. Afterwards, the 3G RE sends the original data to the receiver device.

In the second example, the stability of channels can be improved to a great extent. For example, a probability that signals in N channels are all unstable is much lower than a probability that signals in one channel is unstable, thereby decreasing data delay to a great extent when the bandwidth meets requirements.

In a third example, the 3G AE encapsulates the data sent by the sender device into N PDUs through a fragment algorithm with redundancy and concurrency. Detailedly, the 3G AE divides the data sent by the sender device into N−1 parts, encapsulates the N−1 parts into N−1 PDUs, and performs an XOR operation for the N−1 PDUs to generate a PDU, recorded as the $N_{th}$ PDU. In this way, N PDUs are obtained.

In the third example, the process of transmitting, by the 3G AE, the N PDUs to the 3G RE through the M channels between the 3G AE and the 3G RE may refer to FIG. 4.

In the third example, the process of restoring the received PDUs to the data sent by the sender device includes that, the 3G AE restores the data sent by the sender device according to any received N−1 PDUs. Afterwards, the 3G RE transmits the data to the receiver device.

Figure 7:
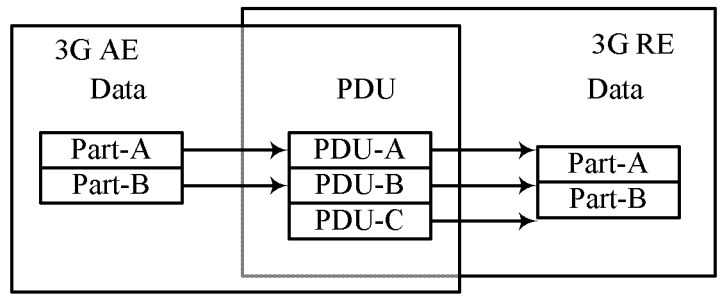
FIG. 7 is a schematic diagram illustrating a process of transmitting, by a 3G AE, data sent by a sender device to a 3G RE according to a third example of the present application.

In the third example, suppose N is equal to M, N and M are both equal to 3, and the 3 channels between the 3G AE and the 3G RE are provided by the mobile operator, the unicom operator and the telecom operator respectively. As shown in FIG. 7, the 3G AE divides the data sent by the sender device into 2 parts, recorded as part-A and part-B respectively, and encapsulates the 2 parts into 2 PDUs, recorded as PDU-A and PDU-B respectively. The 3G AE performs the XOR operation for the two PDUs (PDU-A and PDU-B) to generate a PDU, recorded as PDU-C, and then transmits the 3 PDUs to the 3G RE through the 3 channels provided by the mobile operator, the unicorn operator and the telecom operator respectively.

According to discrete mathematics, the XOR operation meets $A \oplus A=0$, $A \oplus B=B \oplus A$, and $0 \oplus A=A$, where $\oplus$ represents the XOR operation.

Because of PDU-C=PDU-A⊕PDU-B, the 3G RE can calculate PDU-A and PDU-B as long as the 3G RE receives any two PDUs, and further restores the data sent by the sender device.

Suppose the 3G RE receives PDU-A and PDU-B, the 3G RE can restore the data sent by the sender device without question.

Suppose the 3G RE receives PDU-A and PDU-C, and then PDU-A⊕PDU-C=PDU-A ⊕PDU-A⊕PDU-B=0 ⊕PDU-B=PDU-B. As can be seen, PDU-B is obtained, and thus the original data can be restored.

Suppose the 3G RE receives PDU-B and PDU-C, and then PDU-C⊕PDU-B=PDU-A⊕PDU-B⊕PDU-B=PDU-A⊕0=PDU-A. As can be seen, PDU-A is obtained, and the original data can be restored.

By the third example, the redundancy of channels can be ensured. For example, a probability that signals in N−1 channels are all unstable is much lower than a probability that the signals in one channel is unstable. Usually, data transmission in the unstable channel is slow, but the receiver device does not need to wait for the data in the slowest channel.

And thus, the three examples have been described.

It should be noted that, the channels between the 3G AE and the 3G RE may be randomly unstable, and thus overtime and retransmission should be considered to implement reliability, redundancy and high efficiency of channels. In an example, 3 channels are established between the 3G AE and the 3G RE, and underlying transport adopts TCP. Based on this, transmission control between the 3G AE and the 3G RE is described.

Each PDU has s sequence number, referred to as SeqNum, and the SeqNum of the PDU is determined by the 3G AE. When the 3G AE transmits each PDU to the 3G RE, the 3G AE reserves the PDU, thereby reserving the PDU before the 3G AE receives, in a predefined period of time, a confirmation signal of the PDU returned by the 3G RE. In this way, when the 3G AE receives, in the predefined period of time, the confirmation signal of the PDU returned by the 3G RE, the 3G AE removes the PDU from all reserved PDUs. However, when the 3G AE does not receive, in the predefined period of time, the confirmation signal of the PDU returned by the 3G RE, the 3G AE deems that the PDU expires, e.g., packet loss, selects at least one channel from all channels or from other channels except the channel through which the PDU is transmitted, and retransmits the PDU to the 3G RE through the selected channel. The method of selecting the channel may be implemented through the fragment algorithm. When the 3G RE receives the retransmitted PDU, the 3G RE processes the firstly received PDU, and discards other received PDUs.

And thus, the method provided by the example of the present application has been described. An apparatus provided by an example of the present application is described hereinafter.

Figure 8:
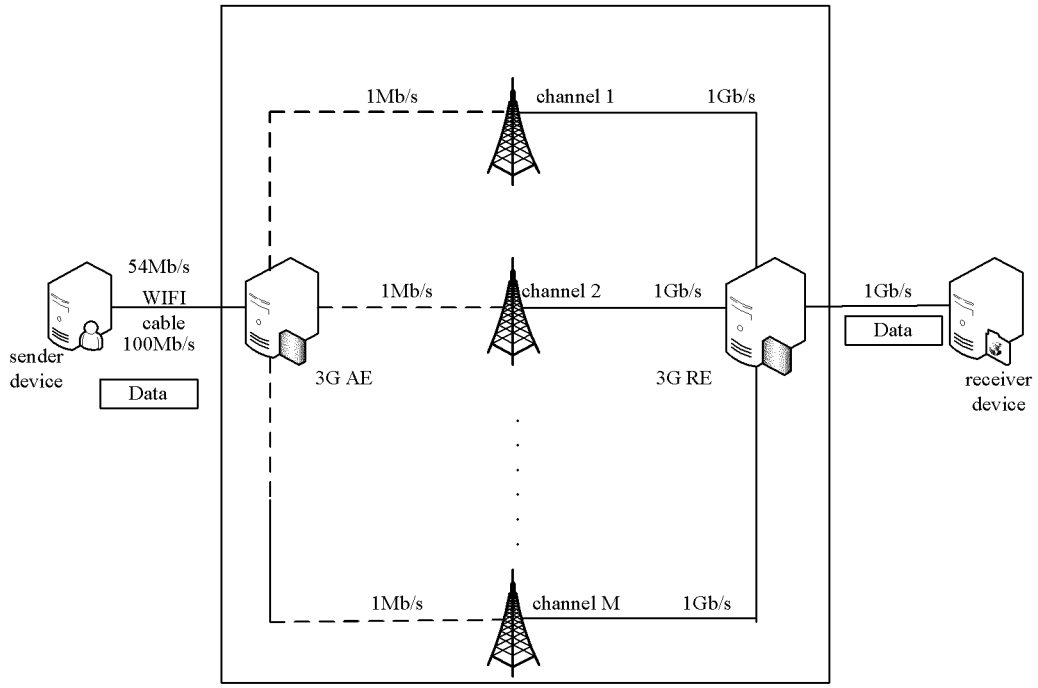
FIG. 8 is a schematic diagram illustrating the structure of a data transmission apparatus according to an example of the present application.

FIG. 8 is a schematic diagram illustrating the structure of a data transmission apparatus according to an example of the present application. As shown in FIG. 8, the apparatus includes a 3G AE and a 3G RE. The 3G AE and the 3G RE are deployed between a sender device and a receiver device, and M channels are established between the 3G AE and the 3G RE, through which the sender device accesses a public network via a 3G network. M is larger than or equal to 2.

The 3G AE is to encapsulate data sent by the sender device into N PDUs, and transmit the N PDUs to the 3G RE through the M channels between the 3G AE and the 3G RE, where N is larger than or equal to 2, and is equal to or different from M.

The 3G RE is to restore the received PDUs to the data sent by the sender device, and send the data to the receiver device.

In an example, the 3G AE is to divide the data sent by the sender device into N parts, and encapsulate the N parts into the N PDUs.

In an example, the 3G AE is to copy the data sent by the sender device into N copies, and encapsulate the N copies into the N PDUs. The 3G RE is to restore a firstly received PDU into the data sent by the sender device, and discard a subsequently received PDU.

In an example, the 3G AE is to divide the data sent by the sender device into N−1 parts, perform an XOR operation for the N−1 parts to generate a PDU. The 3G RE is to restore the data sent by the sender device according to any received N−1 PDUs.

The 3G AE is further to, when the 3G AE transmits each PDU to the 3G RE, reserve the PDU; when the 3G AE receives, in a predefined period of time, a confirmation signal of the PDU returned by the 3G RE, remove the PDU from all reserved PDUs; when the 3G AE does not receive, in the predefined period of time, the confirmation signal of the PDU returned by the 3G RE, select at least one channel from all channels or from other channels except the channel through which the PDU is transmitted, and retransmit the PDU to the 3G RE through the selected channel. The 3G RE is further to, when the 3G RE receives the retransmitted PDU, process the firstly received PDU, and discard other received PDUs.

As can be seen from the above solution, through introducing the 3G AE and the 3G RE, the data sent by the sender device and the data received by the receiver device are not changed, but are processed during the transmission procedure. In this way, service transparency can be ensured, and black box processing for the multi-channel 3G access can be implemented, so that the conventional communication software can adapt to a new structure model without modification.

Moreover, the PDUs are transmitted in parallel through multiple channels between the 3G AE and the 3G RE, thereby increasing bandwidth and stability of data transmission compared with an original single channel, and decreasing data delay and packet loss rate.

The foregoing is only examples of the present application and is not used to limit the protection scope of the present application. Any modification, equivalent substitution and improvement without departing from the spirit and principle of the present application are within the protection scope of the present application.

What is claimed is:

1. A data transmission method, wherein a 3rd-Generation (3G) Access Endpoint (AE) and a 3G Relay Endpoint (RE) are deployed between a sender device and a receiver device, M channels are established between the 3G AE and the 3G RE, M is larger than or equal to 2, and the method comprises:
    encapsulating, by the 3G AE, data sent by the sender device into N Protocol Data Units (PDUs), and transmitting the N PDUs to the 3G RE through the M channels between the 3G AE and the 3G RE; and
    restoring, by the 3G RE, the received PDUs to the data sent by the sender device, and sending the data to the receiver device; where
    N is larger than or equal to 2, and equal to or different from M;
    wherein the encapsulating, by the 3G AE, the data sent by the sender device into the N PDUs comprises:
    dividing, by the 3G AE, the data sent by the sender device into N parts, and encapsulating the N parts into the N PDUs;
    wherein the method further comprises:
        when the 3G AE transmits each PDU to the 3G RE, reserving, by the 3G AE, the PDU;
        when the 3G AE receives, in a predefined period of time, a confirmation signal of the PDU returned by the 3G RE, removing the PDU from all reserved PDUs;
        when the 3G AE does not receive, in the predefined period of time, the confirmation signal of the PDU returned by the 3G RE, selecting at least one channel from all channels or from other channels except the channel through which the PDU is transmitted, and retransmitting the PDU to the 3G RE through the selected channel; and
        when the 3G RE receives the retransmitted PDU, processing a firstly received PDU, and discard other received PDUs.

2. The method of claim 1, wherein the transmitting the N PDUs to the 3G RE through the M channels between the 3G AE and the 3G RE comprises:
    taking the N PDUs as current PDUs, and determining whether the number of the current PDUs is larger than or equal to M;
    if the number of the current PDUs is larger than or equal to M, selecting M PDUs from the current PDUs sequentially, transmitting the selected M PDUs to the 3G RE through the M channels, taking the remained PDUs as the current PDUs, and performing the determining whether the number of the current PDUs is larger than or equal to M;
    if the number of the current PDUs is smaller than M, selecting channels from the M channels, wherein the number of the selected channels is equal to the number of the current PDUs, and transmitting the current PDUs to the 3G RE through the selected channels sequentially.

3. A data transmission method, wherein a 3rd-Generation (3G) Access Endpoint (AE) and a 3G Relay Endpoint (RE) are deployed between a sender device and a receiver device, M channels are established between the 3G AE and the 3G RE, M is larger than or equal to 2, and the method comprises:
    encapsulating, by the 3G AE, data sent by the sender device into N Protocol Data Units (PDUs), and transmitting the N PDUs to the 3G RE through the M channels between the 3G AE and the 3G RE; and
    restoring, by the 3G RE, the received PDUs to the data sent by the sender device, and sending the data to the receiver device; where
    N is larger than or equal to 2, and equal to or different from M;
    wherein the encapsulating, by the 3G AE, the data sent by the sender device into the N PDUs comprises:
    copying, by the 3G AE, the data sent by the sender device into N copies, and encapsulating the N copies into the N PDUs; and
    the restoring, by the 3G RE, the received PDUs to the data sent by the sender device comprises:
        restoring, by the 3G RE, a firstly received PDU to the data sent by the sender device, and discarding a subsequently received PDU;
    wherein the method further comprises:
        when the 3G AE transmits each PDU to the 3G RE, reserving, by the 3G AE, the PDU;
        when the 3G AE receives, in a predefined period of time, a confirmation signal of the PDU returned by the 3G RE, removing the PDU from all reserved PDUs;
        when the 3G AE does not receive, in the predefined period of time, the confirmation signal of the PDU returned by the 3G RE, selecting at least one channel from all channels or from other channels except the channel through which the PDU is transmitted, and retransmitting the PDU to the 3G RE through the selected channel; and
        when the 3G RE receives the retransmitted PDU, processing a firstly received PDU, and discard other received PDUs.

4. The method of claim 3, wherein the transmitting the N PDUs to the 3G RE through the M channels between the 3G AE and the 3G RE comprises:
    taking the N PDUs as current PDUs, and determining whether the number of the current PDUs is larger than or equal to M;
    if the number of the current PDUs is larger than or equal to M, selecting M PDUs from the current PDUs sequentially, transmitting the selected M PDUs to the 3G RE through the M channels, taking the remained PDUs as the current PDUs, and performing the determining whether the number of the current PDUs is larger than or equal to M;
    if the number of the current PDUs is smaller than M, selecting channels from the M channels, wherein the number of the selected channels is equal to the number of the current PDUs, and transmitting the current PDUs to the 3G RE through the selected channels sequentially.

5. A data transmission apparatus, comprising:
    a 3rd-Generation (3G) Access Endpoint (AE) and a 3G Relay Endpoint (RE), wherein the 3G AE and the 3G RE are deployed between a sender device and a receiver device, M channels are established between the 3G AE and the 3G RE, and M is larger than or equal to 2,
    wherein the 3G AE is configured to encapsulate data sent by the sender device into N Protocol Data Units (PDUs), and transmit the N PDUs to the 3G RE through the M channels between the 3G AE and the 3G RE, wherein N is larger than or equal to 2, and is equal to or different from M, and wherein the 3G RE is configured to restore the received PDUs to the data sent by the sender device, and send the data to the receiver device;

wherein the 3G AE is configured to divide the data sent by the sender device into N−1 parts, perform an XOR operation for the N−1 parts to generate a PDU; and the 3G RE is configured to restore the data sent by the sender device according to any received N−1 PDUs;

wherein the 3G AE is further configured to, when the 3G AE transmits each PDU to the 3G RE, reserve the PDU; when the 3G AE receives, in a predefined period of time, a confirmation signal of the PDU returned by the 3G RE, remove the PDU from all reserved PDUs; when the 3G AE does not receive, in the predefined period of time, the confirmation signal of the PDU returned by the 3G RE, select at least one channel from all channels or from other channels except the channel through which the PDU is transmitted, and retransmit the PDU to the 3G RE through the selected channel;

and wherein the 3G RE is further configured to, when the 3G RE receives the retransmitted PDU, process a firstly received PDU, and discard other received PDUs.

\* \* \* \* \*